(12) United States Patent
Szigeti et al.

(10) Patent No.: US 11,893,849 B2
(45) Date of Patent: Feb. 6, 2024

(54) PROVIDING PHYSICAL ACCESS TO A SECURED SPACE BASED ON HIGH-FREQUENCY ELECTROMAGNETIC SIGNALING

(71) Applicant: Cisco Technology, Inc., San Jose, CA (US)

(72) Inventors: Thomas Szigeti, Vancouver (CA); David Hanes, Lewisville, NC (US); Gonzalo Salgueiro, Raleigh, NC (US); Sebastian Jeuk, Munich (DE)

(73) Assignee: Cisco Technology, Inc., San Jose, CA (US)

( * ) Notice: Subject to any disclaimer, the term of this patent is extended or adjusted under 35 U.S.C. 154(b) by 164 days.

(21) Appl. No.: 17/474,002

(22) Filed: Sep. 13, 2021

(65) Prior Publication Data
US 2023/0083426 A1 Mar. 16, 2023

(51) Int. Cl.
*G07C 9/28* (2020.01)
*G07C 9/22* (2020.01)
*H04L 9/40* (2022.01)
*G07C 9/00* (2020.01)

(52) U.S. Cl.
CPC .......... *G07C 9/28* (2020.01); *G07C 9/00309* (2013.01); *G07C 9/22* (2020.01); *H04L 63/0853* (2013.01); *G07C 2009/00769* (2013.01); *H04L 2463/082* (2013.01)

(58) Field of Classification Search
CPC ........ G07C 9/28; G07C 9/00309; G07C 9/22; G07C 2009/00769; H04L 63/0853; H04L 2463/082; H04L 12/28

USPC ............................................ 340/5.2, 5.3, 5.8
See application file for complete search history.

(56) References Cited

U.S. PATENT DOCUMENTS

| | | | | |
|---|---|---|---|---|
| 6,867,683 B2 * | 3/2005 | Calvesio | ................ | G07C 9/257 340/5.52 |
| 8,542,879 B1 * | 9/2013 | Nechyba | .............. | G06V 40/171 382/118 |
| 9,501,883 B2 * | 11/2016 | Handville | ............ | H04B 5/0056 |
| 9,596,084 B2 * | 3/2017 | Papakipos | .............. | H04N 7/183 |
| 9,710,978 B1 | 7/2017 | Sequeira et al. | | |
| 10,044,707 B1 * | 8/2018 | Ji | .......................... | H04L 9/0891 |
| 10,235,822 B2 * | 3/2019 | Nye | ........................ | G05B 15/02 |
| 10,255,732 B2 * | 4/2019 | Prasad | ............... | G07C 9/00309 |
| 10,274,909 B2 * | 4/2019 | Lyman | ................ | H04L 12/2803 |
| 10,304,114 B2 * | 5/2019 | Melcher | ................ | H04W 84/18 |

(Continued)

*Primary Examiner* — Nam V Nguyen
(74) *Attorney, Agent, or Firm* — Lee & Hayes P.C.

(57) ABSTRACT

This disclosure describes techniques for selectively providing access to a physical space. An example method includes identifying a location of a device associated with an authorized user based on an electromagnetic signal received by at least one sensor from the device. The electromagnetic signal has a frequency that is greater than or equal to 24 gigahertz (GHz). The example method further includes determining that the location of the device is within a threshold distance of a location of a threshold to a secured space and determining that an authentication score indicating that an individual carrying the device is the authorized user is greater than a threshold score. The authentication score is associated with multiple authentication factors identified by the device. Based on determining that the authentication score is greater than the threshold score, the threshold is unlocked and/or opened.

20 Claims, 7 Drawing Sheets

(56) References Cited

U.S. PATENT DOCUMENTS

| | | | |
|---|---|---|---|
| 10,305,895 B2* | 5/2019 | Barry | G07C 9/257 |
| 10,719,999 B2* | 7/2020 | Love | G07C 9/00309 |
| 10,720,166 B2* | 7/2020 | Caldwell | G10L 15/30 |
| 10,839,631 B1* | 11/2020 | LaRovere | G07C 1/32 |
| 11,012,869 B1 | 5/2021 | Kwatra et al. | |
| 11,128,376 B1* | 9/2021 | Passe | H04W 12/082 |
| 11,145,016 B1* | 10/2021 | Brophy | G06Q 30/0645 |
| 11,210,380 B2* | 12/2021 | Hoyos | H04L 63/10 |
| 2004/0153671 A1* | 8/2004 | Schuyler | G07C 9/28 |
| | | | 726/9 |
| 2016/0153671 A9* | 6/2016 | Karamanos | F24F 13/0245 |
| | | | 62/77 |
| 2017/0251365 A1 | 8/2017 | Burchardt et al. | |
| 2017/0318460 A1 | 11/2017 | Kumar et al. | |
| 2017/0339561 A1 | 11/2017 | Wennemyr et al. | |

\* cited by examiner

PROVIDING PHYSICAL ACCESS TO A SECURED SPACE BASED ON HIGH-FREQUENCY ELECTROMAGNETIC SIGNALING

TECHNICAL FIELD

The present disclosure relates generally to techniques for providing authorized individuals with physical access to a secured space, as well as to techniques for tracking individuals that enter and exit the secured space.

BACKGROUND

Organizations restrict physical access to various spaces and assets to pre-approved personnel. Historically, physical access to a secured space could be restricted by a physical lock on the door to the secured space. An individual could enter the secured space if the individual unlocked the door with a physical key. With the development of magnetic stripe technology, radio frequency identification (RFID), near field communication (NFC), and other technologies, organizations began distributing badges to authorized personnel in order to provide them with access to secured spaces. For example, an authorized individual carrying a badge may access a secured space by enabling a badge reader at the door of the secured space to scan the individual's badge. Upon confirming that the badge is associated with the authorized individual, the badge reader may cause the door to unlock in order to allow the individual to access the secured space.

Physical key- and badge-based access technologies are ubiquitous in workplace environments, but have a number of significant problems. First, these existing technologies do not prevent an unauthorized individual from gaining access to the secured space if they steal a key or badge of an authorized individual. Second, existing technologies do not prevent an unauthorized individual from following an authorized individual through the door once the authorized individual is permitted access to the secured space. Third, existing technologies do not provide a mechanism for tracking which individuals have entered and exited a secured space. For instance, an authorized individual may be prompted to scan their badge to enter the secured space, but may not scan their badge when exiting the secured space, thereby preventing tracking of the individual's exit from the secured space.

More sophisticated technologies have been developed to address some of these problems. For example, a highly secured space may require biometric identification (e.g., retinal or fingerprint scanning) to confirm the identity of an authorized individual seeking to enter the space. However, these technologies have their own problems. Namely, using biometric-based access technologies to access to a physical space can be cumbersome and time-consuming for users.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DESCRIPTION OF EXAMPLE EMBODIMENTS

Overview

Figure 1:
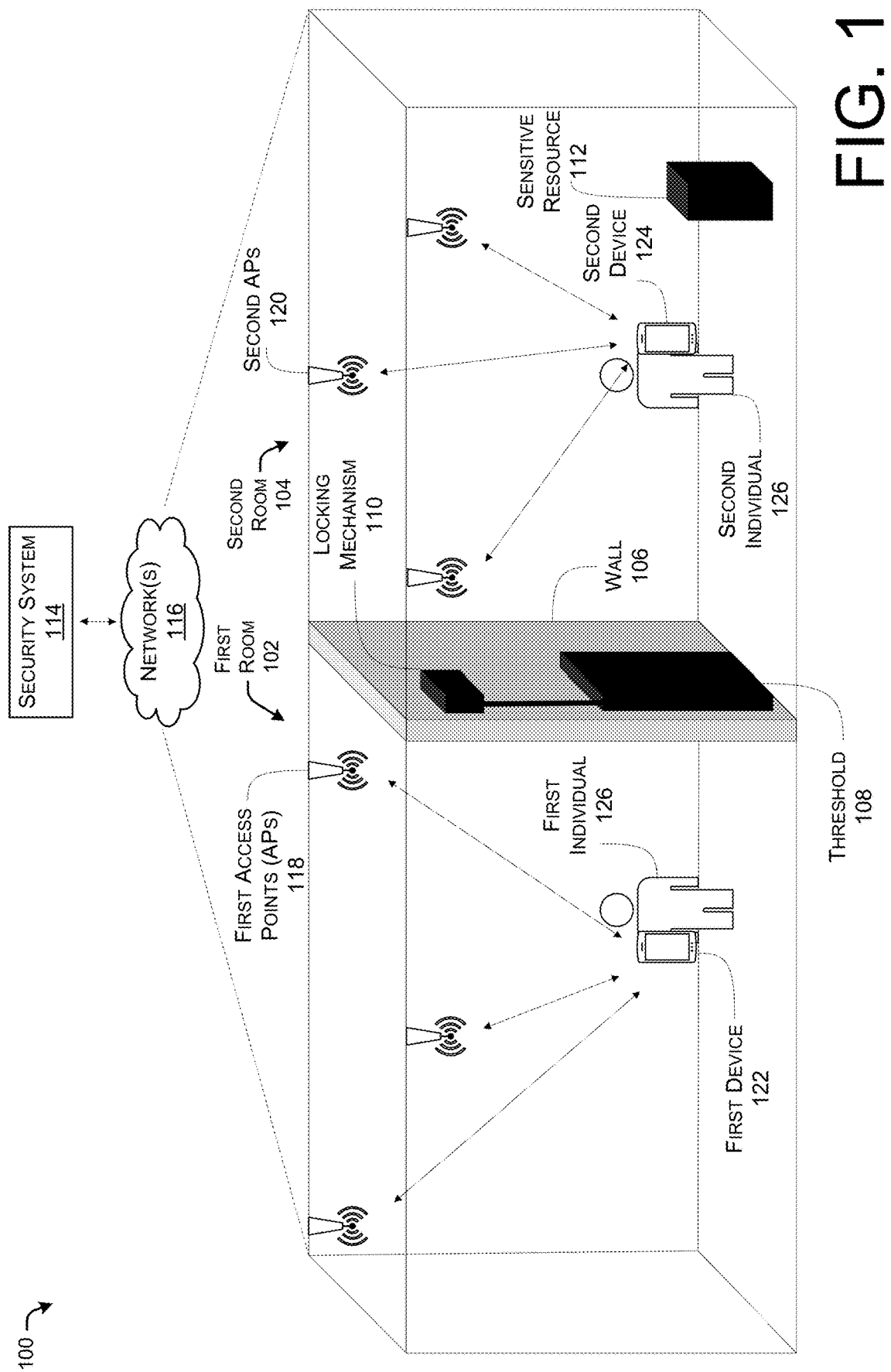
FIG. 1 illustrates an example environment for selectively providing physical access to a secured space.

This disclosure describes an example method including identifying a location of a device associated with an authorized user based on an electromagnetic signal received by at least one sensor from the device, the electromagnetic signal having a frequency that is greater than or equal to 24 gigahertz (GHz); determining that the location of the device is within a threshold distance of a location of a threshold to a secured space; based on determining that the location of the device is within the threshold distance of the location of the threshold, determining that an authentication score indicating that an individual carrying the device is the authorized user is greater than a threshold score, the authentication score being associated with multiple authentication factors identified by the device; and based on determining that the authentication score is greater than the threshold score, unlocking and/or opening the threshold to the secured space. In various examples, the electromagnetic signal includes a Li-Fi signal. The location of the device may be within a building that includes walls.

In some cases, the example further includes repeatedly recalculating the authentication score by: repeatedly receiving, from the device, indications of the multiple authentication factors associated with the individual carrying the device; and repeatedly comparing the multiple authentication factors to predetermined authentication factors associated with the authorized user.

According to some instances, the multiple authentication factors include two or more of: a password entered into the device; a biometric factor detected by the device; the location of the device over time; a connection between the device and a peripheral device; a connection between the device and a wireless network; or a physical orientation of the device over time.

In some instances, the electromagnetic signal is a first electromagnetic signal, the at least one sensor is at least one first sensor, wherein the example method further includes: determining, based on a second electromagnetic signal received by at least one second sensor from the device, that the location of the device has moved into the secured space at a particular time; and based on determining that the location of the device has moved into the secured space, storing an indication of the particular time and an indication of at least one of the device or the authorized user. For instance, the particular time is a first time, and the example method further includes: determining, based on a third electromagnetic signal received by at least one third sensor from the device, that the location of the device has moved out of the secured space at a second time; and based on determining that the location of the device has moved out of the secured space, storing an indication of the second time and an indication of at least one of the device or the authorized user.

In various implementations, the example method further includes identifying a location of a second device associated with a second authorized user based on a second electromagnetic signal received by the at least one second sensor from the second device at a particular time; determining that the location of the second device is within the secured space; determining that a second authentication score indicating that a second individual carrying the second device is the second authorized user is less than the threshold score; and based on determining that the location of the second device is within the secured space and determining that the second authentication score is lower than the threshold score: storing an indication of the particular time and an indication of the second device; and transmitting an alert indicating a possible breach of the secured space to an external device.

Example Embodiments

This disclosure describes various techniques for providing selective, secured access to physical spaces. In various cases, a system tracks the position of an individual based on high-frequency electromagnetic signaling between a device of the individual and one or more access points (APs). In particular examples, the signaling includes Li-Fi signals that are highly attenuated by walls, doorways, and other impediments, which can enable the system to accurately identify the position of the device in an indoor environment. When the device is detected in the vicinity of a secured threshold, the system initiates an authentication procedure to confirm that the individual is authorized to pass through the threshold. Upon confirming that the individual is authorized, the system automatically opens the secured threshold, thereby enabling the individual to enter a secured space. Furthermore, the system tracks who has entered and/or exited the secured space, as well as the times at which they have entered and/or exited the secured space. The system can also control the secured threshold to prevent unauthorized individuals from entering the secured space.

Implementations described herein provide specific improvements to the technical field of physical security. First, unlike previous technologies, implementations of the present disclosure provide frictionless access to secured spaces for authorized individuals. That is, individuals do not have to perform manual steps (e.g., entering in a code into a keypad, swiping a badge, scanning a retina, etc.) in order to gain access to a secured space. Second, unlike previous technologies, implementations described herein provide mechanisms for preventing unauthorized individuals from following authorized individuals into secured spaces. Third, various examples described herein provide techniques for accurately tracking individuals entering and exiting a secured space.

Various implementations of the present disclosure will be described in detail with reference to the drawings, wherein like reference numerals present like parts and assemblies throughout the several views. Additionally, any samples set forth in this specification are not intended to be limiting and merely demonstrate some of the many possible implementations.

FIG. 1 illustrates an example environment 100 for selectively providing physical access to a secured space. The environment 100 includes a first room 102 and a second room 104. In various implementations, the first room 102 and the second room 104 are included in a building or other structure. The first room 102 is separated from the second room 104 by a wall 106, which is disposed between the first room 102 and the second room 104.

A threshold 108 is disposed in the wall 106. The threshold 108, for example, is a door, a window, or any other mechanism through which the wall 106 can be physically traversed. A locking mechanism 110 is coupled to the threshold 108. In various implementations, the locking mechanism 110 selectively locks or unlocks the threshold 108. When the threshold 108 is locked, an individual may be unable to physically travel between the first room 102 and the second room 104 via the threshold 108. In some implementations, the locking mechanism 110 is configured to selectively open the threshold 108.

In various cases, the second room 104 is a secured physical space. For example, the second room 104 includes a sensitive resource 112. An organization that owns and/or leases the building may restrict physical access to the sensitive resource 112. For example, the sensitive resource 112 may be a server that stores trade secrets, governmental secrets, or other confidential information. To protect the sensitive resource 112, the organization may restrict access to the second room 104.

According to various implementations, a security system 114 may selectively provide access to the second room 104 and/or the sensitive resource 112 to authorized individuals in a frictionless manner. The security system 114 may be implemented in hardware, software, or both. In some cases, the security system 114 includes at least one virtual machine (VM) hosted on one or more physical computing devices. According to some implementations, the security system 114 is located on the premises of the building or remotely from the building.

The security system 114 is connected to various other devices in the environment 100 by one or more communication networks 116. As used herein, the term "communication network," and its equivalents, can refer to any network configured to transfer data from one endpoint to another. A communication network may include one or more fiber-optic networks, one or more wired networks, one or more wireless networks, or any combination thereof. Examples of communication networks include, for instance, BLUETOOTH networks, WI-FI networks, 3GPP radio access networks (RANs) (e.g., including an gNodeB, an eNodeB, etc.), core networks (e.g., a 3GPP core network, such as a $3^{rd}$ Generation (3G) core network, an Evolved Packet Core (EPC), or a 5G Core (5GC), etc.), an IP multimedia subsystem (IMS) network, the Internet, or the like. Various elements illustrated in FIG. 1 transmit data to one another via the communication network(s) 116.

The security system 114 may identify the locations of various devices in the environment 100 based on signals detected by first access points (APs) 118 and signals detected by second APs 120. In some cases, the first APs 118 and second APs 120 may be communicatively coupled to the security system 114 via one or more modems (not illustrated) connected to the network(s) 116.

The first APs 118 and the second APs 120, in various cases, are configured to wirelessly communicate with devices in the environment 100. For example, the first APs 118 and the second APs 120 may transmit and/or receive signals wirelessly with a first device 122 and a second device 124 located in the environment 100. In some cases, the first APs 118 and the second APs 120 are configured to transmit and/or receive electromagnetic signals with the first device 122 and the second device 124.

In various implementations, the electromagnetic signals are significantly attenuated by the wall 106. For example, the electromagnetic signals may have frequencies of greater than 24 gigahertz (GHz), 100 GHz, or 300 GHz. Because the electromagnetic signals are highly attenuated by the wall 106, the first APs 118 may receive electromagnetic signals from devices within the first room 102 and not the second room 104 with relatively high certainty. Similarly, the second APs 120 may receive electromagnetic signals from the devices within the second room 104, and not the first room 102, with relatively high certainty. In some cases, the first APs 118 and/or the second APs 120 include one or more emitters (e.g., light-emitting diodes (LEDs)) configured to transmit the electromagnetic signals; and the first device 122 and/or the second device 124 include one or more detectors (e.g., photosensors) configured to detect the electromagnetic signals. In some implementations, the first device 122 and/or the second device 124 include one or more emitters configured to transmit the electromagnetic signals; and the first APs 118 and/or the second APs 120 include one or more detectors configured to detect the electromagnetic signals.

In various implementations, the electromagnetic signals include visible light signals with one or more frequencies that are greater than or equal to 380 terahertz (THz) and less than or equal to 800 THz. The electromagnetic signals, for example, are Li-Fi signals. Li-Fi (also referred to as "LiFi") is a light-based wireless communication technology. An example Li-Fi transmitter transmits light to an example Li-Fi receiver. The transmitter encodes data in the light by modulating the intensity of the light over time. Accordingly, the receiver may derive the data by demodulating the light signal. Li-Fi signals may include electromagnetic signals in the ultraviolet (wavelengths in a range of 10 to 400 nanometers (nm); frequencies in a range of 30 petahertz (PHz) to 750 terahertz (THz), infrared (wavelengths in a range of 700 nm to 1 mm; frequencies in a range of 430 THz to 300 GHz), and visible light (wavelengths in a range of 400 nm to 700 nm; frequencies in a range of 750 THz to 430 THz) spectra.

According to various examples, the security system 114 determines the locations of the first device 122 and the second device 124 in the building based on communications between the first device 122, the second device 124, the first APs 118, and the second APs 120. For example, at least one of the first APs 118 may receive a first electromagnetic signal from the first device 122. Because the first electromagnetic signal is unable to traverse the wall 106 (or other walls or barriers in the building), the security system 114 may determine that the first device 122 was located in the first room 102 when it transmitted the first electromagnetic signal.

In some cases, the first electromagnetic signal is received by multiple (e.g., at least three) of the first APs 118, and the security system 114 is configured to determine that the location of the first device 122 is within the first room 102. Similarly, at least one of the second APs 120 may receive a second electromagnetic signal from the second device 124. Because the second electromagnetic signal is unable to traverse the wall 106 (or other walls or barriers in the building), the security system 114 may determine that the second device 124 was located in the second room 104 when it transmitted the second electromagnetic signal. In some cases, the security system 114 triangulates the location of the second device 124 within the second room 104 based on a discrepancy of times at which the second electromagnetic signal was received by multiple (e.g., at least three of) the second APs 120. According to some implementations, the security system 114 determines that the location of the first device 122 is within the first room 102 and/or that the location of the second device 124 is within the second room 104 without triangulation, due to the assumption that the first APs 118 would be unable to receive the first electromagnetic signal unless the first device 122 was located in the first room 102 and/or that the second APs 120 would be unable to receive the second electromagnetic signal unless the second device 124 was located in the second room 104.

In various implementations, the security system 114 may provide a first individual 126 using the first device 122 access to the second room 104 in a frictionless matter, provided that the first individual 126 is authorized to access the second room 104. In particular cases, the first individual 126 is carrying and/or wearing the first device 122. The security system 114 may determine that the first device 122 is located within a threshold distance and/or a predetermined area in proximity to the threshold 108. For example, the security system 114 determines that the first device 122 is within 1 meter (m), 2 m, 3 m, or some other distance of the threshold 108.

Upon determining that the first device 122 is located within the threshold distance and/or the predetermined area in proximity to the threshold 108, the security system 114 may confirm that the first individual 126 is authorized to enter the second room 104. In various cases, the security system 114 may store indications of one or more authorized individuals that are permitted to enter the second room 104. For example, the organization may pre-identify a subset of employees and/or contractors that are authorized to enter the second room 104 and/or have access to the sensitive resource 112. In some cases, the security system 114 further stores indications of one or more devices associated with the authorized individuals. However, even if the security system 114 determines that the first device 122 is an authorized device, that may not be enough to cause the security system 114 to provide the first individual 126 access to the second room 104. For example, if the first individual 126 is malicious and has stolen the first device 122 with the intent of entering the second room 104, the security system 114 may refrain from giving the first individual 126 access to the second room 104.

In various implementations, the security system 114 selectively provides the first individual 126 with access to the second room 104 upon confirming that the first individual 126 is an authorized individual. In some cases, the identity of the first individual 126 is confirmed using multi-factor authentication (MFA). As used herein, the terms "multi-factor authentication," "MFA," and their equivalents, can refer to a process of confirming that a device, the identity of a user of the device, or both, are authorized by requesting and receiving at least two authentication factors from the device, the user, and/or one or more additional devices associated with the user. A user or device is "authorized" when they have permission to access a secure resource. When compared to single-factor authentication, MFA is more likely to successfully authenticate an authorized user or device and to successfully deny an unauthorized user or device. An example MFA process includes requesting a first authentication factor; based on receiving the first authentication factor, requesting a second authentication factor; and based on receiving the second authentication factor, enabling access to a protected resource (e.g., the second room 104). The first authentication factor and/or the second authentication factor can be received from a single device or multiple devices associated with the same user.

Authentication factors, in some cases, include codes that are known to an authorized user. As used herein, the term "code," and its equivalents, can refer to a predetermined combination of alphanumeric characters and/or pixels. A password is an example of a code that can be used as an authentication factor. Other examples of codes include usernames, personal identification numbers (PINs), employee numbers, social security numbers (SSNs), driver's license numbers, Quick Response (QR) codes, and the like.

Examples of authentication factors include evidence of possession of an object associated with an authorized user. In some examples, the object may be another device associated with the authorized user. An authentication factor may be evidence that the user attempting to use a primary device, such as the first device 122, is also in possession and control of a secondary device associated with the primary device. For instance, the security system 114 may transmit a push notification to secondary device that is associated with the first individual 126 and may confirm that the first device 122 is being used by an authorized individual by confirming receipt of the push notification (e.g., by entering a code specified in the push notification into the first device 122 or selecting a button associated with the push notification on the secondary device). In some implementations, authentication factors may include evidence of possession of a card, a physical key, a Universal Serial Bus (USB) drive, or the like. For example, the first device 122 may include a scanner that is configured to scan a code or chip integrated into the card, key, or USB stick.

Certain authentication factors include evidence that a device is in a particular location associated with an authorized user. For example, an authentication factor may be evidence that a primary device is located in a building associated with a home or workplace of the authorized user. In some cases, the primary device self-reports its location to the security system 114. For example, the primary device may receive signals from multiple satellites (e.g., Global Positioning System (GPS) satellites) and determine the location of primary device based on the signals. In some examples, the security system 114 receives a signal indicative of the location of the first device 122. For example, the signal may indicate that the primary device is connected to an AP (e.g., a Wi-Fi AP) or a Radio Access Network (RAN) associated with a particular coverage area, which may indicate that the primary device is located in the coverage area.

Some authentication factors include evidence of the presence of an authorized user. In some implementations, authentication factors may be biometric factors. As used herein, the term "biometric factor," and its equivalents, can refer to evidence of the presence of a body associated with an authorized user. For example, a biometric factor may refer to data indicative of the authorized user speaking (e.g., an audible password), data indicative of a fingerprint of the authorized user (e.g., a fingerprint scan), data indicative of an eye of the authorized user (e.g., an iris or retina scan), data indicative of a face of the user (e.g., a facial scan), and so on. The security system 114 may recognize a biometric factor by performing techniques such as voice recognition, fingerprint recognition, facial recognition, and the like.

According to some implementations, the identity of the first individual 126 is confirmed using continuous MFA (CMFA). In a CMFA scheme, multiple authentication factors are received from a user or device in a continuous or semi-continuous manner. For example, an authenticating system may automatically receive each type of authentication factor periodically (e.g., once every second, once every minute, etc.) and/or repeatedly. The system may generate a score based on the received authentication factors and may adjust the score over time based on the quality of the authentication factors received and/or the time since the authentication factors have been received. For instance, the security system 114 may be less sure that the first individual 126 is authorized if the last time an authentication factor was received was a relatively long time ago, but may be more sure that the first individual 126 is authorized if the last time the authentication factor was received was a relatively short time ago. The score may reflect the confidence by the security system 114 that the first individual 126 is authorized.

In some cases, the first device 122 calculates the CMFA score of the first individual 126 and transmits the CMFA score to the security system 114. In particular implementations, the security system 114 itself calculates the CMFA score of the first individual 126 based, at least in part, on data transmitted from the first device 122 indicating one or more authentication factors of the first individual 126.

The security system 114 may authenticate the first individual 126. In various cases, the security system 114 may confirm multiple authentication factors received from the first individual 126. The security system 114 may compare the CMFA score of the first individual 126 to one or more thresholds. For instance, the security system 114 may determine that the first individual 126 is authorized by determining that the CMFA score of the first individual 126 is greater than a first threshold or is less than a second threshold. Upon determining that the first individual 126 is authorized, the security system 114 may cause the locking mechanism 110 to unlock and/or open the threshold 108. Accordingly, the first individual 126 may freely enter the second room 104. In some cases, the security system 114 may admit groups of authorized individuals to the second room 104. For instance, the security system 114 may unlock the threshold 108 in response to determining that multiple authorized individuals are within the vicinity of the threshold 108.

In various implementations, the security system 114 determines that the first individual 126 is authorized in a frictionless manner. For example, the CMFA score of the first individual 126 may be calculated based on authentication factors that are passively collected from the first individual 126 and/or received from the first individual 126 prior to the first individual 126 entering the vicinity of the threshold 108. For example, the CMFA score may be based on a pattern of movement of the first device 122 being consistent with previous known patterns of movement of the first individual 126, a code input by the first individual 126 into the first device 122 within a particular time interval, a voice detected by the first device 122 that is consistent with the authorized individual, or other collected factors. The CMFA score of the first individual 126 may be determined prior to the first individual 126 entering the vicinity of the threshold 108. Accordingly, the security system 114 may safely enable access to the second room 104 without requiring the first individual 126 to perform any specific actions. From the perspective of the first individual 126, the first individual 126 can access the second room 104 without swiping a badge, inputting a code into a keypad, or performing any other specific actions to prove identity or authorization. This frictionless access technique can be particularly helpful for individuals who may need to access secure areas quickly and/or without touching any surfaces, such as clinicians in hospitals or researchers in infectious disease laboratories.

The access techniques described herein have other advantages. For example, unlike conventional systems in which an individual merely has to scan a badge in order to gain access to a secure area, malicious individuals cannot circumvent the security system 114 by stealing an object. For instance, if a malicious individual that was not the first individual 126 carried the first device 122 to the vicinity of the threshold 108, the security system 114 would prevent the malicious individual from gaining access to the second room 104. In particular, the security system 114 would recognize that the malicious individual is unauthorized by performing the MFA and/or CMFA techniques described herein. Thus, various implementations described herein provide superior security to conventional techniques.

In various implementations, the security system 114 may also track visitors to the second room 104. For example, the security system 114 may include a database that serves as a log of entries and exits from the second room 104. In various implementations, the security system 114 may generate an entry of the database indicating each individual that enters the second room 104. For example, the security system 114 may add an entry indicating that the first individual 126 has entered the second room 104. In some cases, the security system 114 may generate and/or modify an entry of the database indicating each individual that exits the second room 104. For example, the security system 114 may track that the first individual 126 has left the second room 104 by determining that the first APs 118 have communicated with the first device 122. Optionally, the security system 114 may confirm the identity of the first individual 126 using MFA and/or CMFA in order to determine that the first device 122 is carried by the first individual 126 after the first device 122 has left the second room 104. The security system 114 may generate a new entry of the database indicating that the first individual 126 has left the second room 104 or may modify the existing entry of the database indicating that the first individual 126 has left the second room 104. In some cases, the entries may indicate times at which individuals enter and/or leave the second room 104.

According to some implementations, the security system 114 may identify if an unauthorized user has accessed the second room 104 in a frictionless manner. In a conventional, badge-based system, an unauthorized user may follow an authorized user into a secured space when the authorized user uses her badge to unlock the door to the secured space. Although some organizations attempt to circumvent this problem by requiring authorized users to ask other individuals to prove their credentials prior to allowing them to pass into the secured space, this solution has its own problems. In a practical sense, many individuals are uncomfortable with asking other individuals for their credentials. In addition, certain individuals can be made to felt unwelcome in secured environments if their credentials are consistently questioned by others.

In contrast to conventional techniques, the security system 114 can identify whether an unauthorized individual (not pictured) has followed the first individual 126 into the second room 104. In particular implementations, the security system 114 may sense that the individual has entered the second room 104. For example, the security system 114 may determine that a device carried by the individual has communicated with the second APs 120. In some cases, a motion sensor integrated with the threshold 108 may be used to detect the presence of the unauthorized individual crossing the threshold 108, and an indication of the detected individual may be provided to the security system 114. In addition, the security system 114 may determine that the individual has not been confirmed as authorized. For example, the security system 114 may receive an indication of one or more authentication factors from the individual that are not consistent with any authorized user or may determine that no authentication factors have been collected from the individual.

Upon determining that the unauthorized individual has entered the second room 104, the security system 114 can perform one or more actions. In some cases, the security system 114 stores an indication of the entry of the unauthorized individual. In some implementations, the security system 114 transmits an alert message to an external device, such as a device carried by or otherwise accessed by a security officer who can detain and/or remove the unauthorized individual. In some cases, the security system 114 transmits a message to the sensitive resource 112 that causes the sensitive resource 112 to at least temporarily prevent sharing sensitive information while the unauthorized individual is located in the second room 104.

Figure 2:
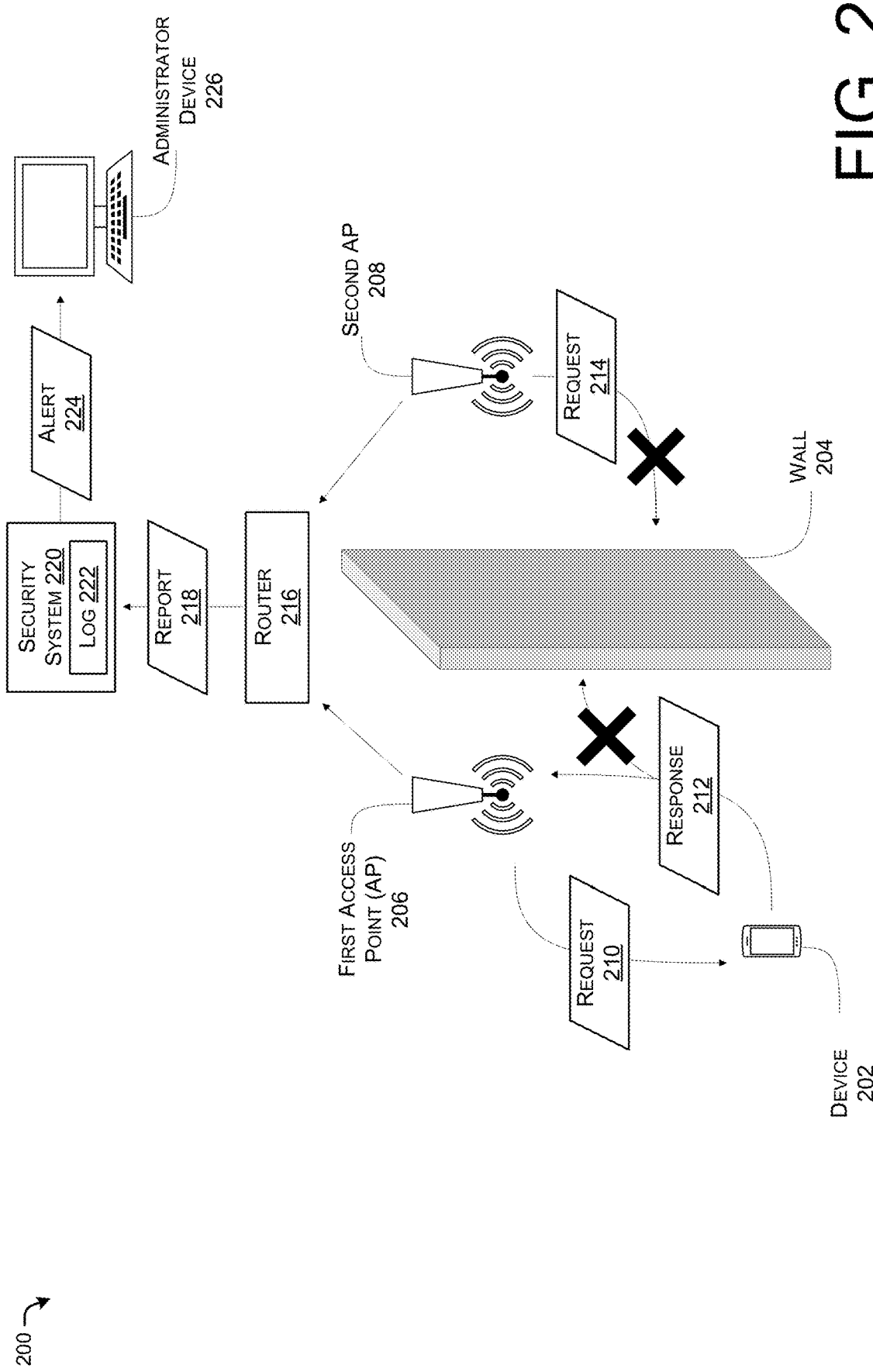
FIG. 2 illustrates example signaling for accurately identifying the location of a device within a building.

FIG. 2 illustrates example signaling 200 for accurately identifying the location of a device 202 within a building. The building includes a wall 204 that is configured to substantially attenuate electromagnetic signals, such as infrared, ultraviolet, and visible light. The wall 204 may further serve to separate different spaces (e.g., rooms, hallways, and so on) within the building. At least one of the spaces in the building may be secured, such as a room that contains a secured resource. Access to the secured space and/or the secured resource may be restricted to a limited number of authorized individuals.

The building may further contain a first AP 204 and a second AP 206. The first AP and the second AP 206 may be located on opposite sides of the wall 204. For example, the first AP 204 may be disposed in a first room, the second AP 206 may be disposed in a second room, and the wall 204 may be disposed between the first room and the second room. The first AP 204 and the second AP 206, in various implementations, may be configured to communicate using electromagnetic signals. For example, the first AP 204 and the second AP 206 may be configured to transmit and/or receive Li-Fi signals within the building.

In particular cases, the first AP 204 is configured to transmit a request 210. Because the device 202 is located on the same side of the wall as the first AP 206, the request 210 may be received by the device 202. In some cases, the request 210 is broadcasted by the first AP 204. The request 210 may cause the device 202 to transmit a response 212. In some examples, the response 212 is broadcasted by the device 202. The response 212 may be received by the first AP 206. In various implementations, the response 212 identifies the device 202. For example, the response 212 may include an address (e.g., an IP address) or some other identifier that is unique to the device 202.

In various examples, the second AP 206 is configured to transmit a request 214. For example, the request 214 is broadcasted by the second AP 208. However, because the wall 204 is disposed between the second AP 208 and the device 202, the device is unable to receive the request 214 from the second AP 208. In addition, the wall 204 also prevents the second AP 208 from receiving the response 212 transmitted by the device 202.

The first AP 206 and the second AP 208 may be communicatively coupled to a router 216. The router 216 may identify that the response 212 has been received by the first AP 206. In various implementations, the router 216 may generate a report 218 indicating that the first AP 206 has received the response 212 from the device 202. The router 216 may provide the report 218 to a security system 220. The security system 220, for instance, is the security system 114 described above with reference to FIG. 1. In various implementations, the security system 220 accurately identifies the location of the device 202 based on the report 218. For example, because the report 218 may indicate that the first AP 202 has received the response 212 and that the second AP 208 has not received the response 212, the security system 220 may infer that the device 202 is located on the same side of the wall 204 as the first AP 206.

The security system 220 may perform one or more actions based on the location of the device 202. In some implementations, the security system 220 may authenticate an individual carrying the device 202. In various implementations, the security system 220 may transmit a message to the device 202 requesting the device 202 to perform MFA on the individual carrying the device 202. In some cases, the security system 220 may request that the device 202 provide a CMFA score associated with the individual carrying the device 202. The security system 220 may use this information to confirm whether the individual is authorized.

In some cases, the security system 220 may cause a threshold to open and/or unlock in the building upon confirming that the location of the device 202 is within the vicinity of the threshold and the individual carrying the device 202 is authorized to enter the room connected to the threshold. Thus, the security system 220 may provide frictionless physical access to a secured room by accurately identifying the location of the device 202.

In some implementations, the security system 220 updates a log 222 based on the location of the device 202 and/or the individual carrying the device 202. The log 222 may be part of the security system 220 or otherwise accessible by the security system 220. The log 222 may be a database or some other type of data structure configured to store multiple entries indicating individuals and/or devices that have entered and/or left spaces in the building. In various examples, the log 222 indicates the presence of individuals and/or devices in spaces in the building. For example, upon determining that the device 202 is located in the same room as the first AP 206, the security system 220 may generate and/or update an entry in the log 222 to indicate the presence of the device 202 and/or the individual carrying the device 202 in the room. Further, if the security system 220 determines that the device 202 has left the room (e.g., the device 202 is detected in the same room as the second AP 208), the security system 220 may generate a new entry and/or update the existing entry in the log 222 to indicate that the device 202 and/or the individual carrying the device 202 has left the room including the first AP 206.

In various implementations, the security system 220 may determine that the device 202 is in an improper location. For example, the security system 220 may determine that the individual associated with the device 202 is not authorized to be present in the same room as the first AP 206. In some cases, the security system 220 further determines that the individual is authenticated as carrying the device 202 in the room. According to some implementations, the security system 220 determines that an identity (e.g., an IP address, device-specific identifier, etc.) of the device 202 is absent from a look-up table that lists devices associated with personnel authorized to be present in the room. In some cases, the security system 220 cross-references an identity (e.g., a name, employee number, etc.) of the individual associated with the device 202 is absent from the look-up table listing personnel authorized to be present in the room. In particular examples, the look-up table lists unauthorized devices and/or individuals, and the security system 220 determines that the identity of the device 202 and/or the individual is listed in the look-up table.

In response to determining that the device 202 and/or individual is unauthorized, the security system 220 may generate an alert 224 indicating the presence of the device 202 and/or individual in the room. In various examples, the alert 224 is transmitted to an administrator device 226. The administrator device 226 may be a computing device. For example, the administrator device 226 is a laptop computer, a server, a tablet computer, a mobile phone, a desktop computer, or some other type of computing device. In various implementations, the administrator device 226 may output the alert 224 to a user, such as security personnel of the building. In various cases, the user may take manual actions to remove the unauthorized individual from the room and/or reduce the impact of the unauthorized individual's presence in the room.

Figure 3:
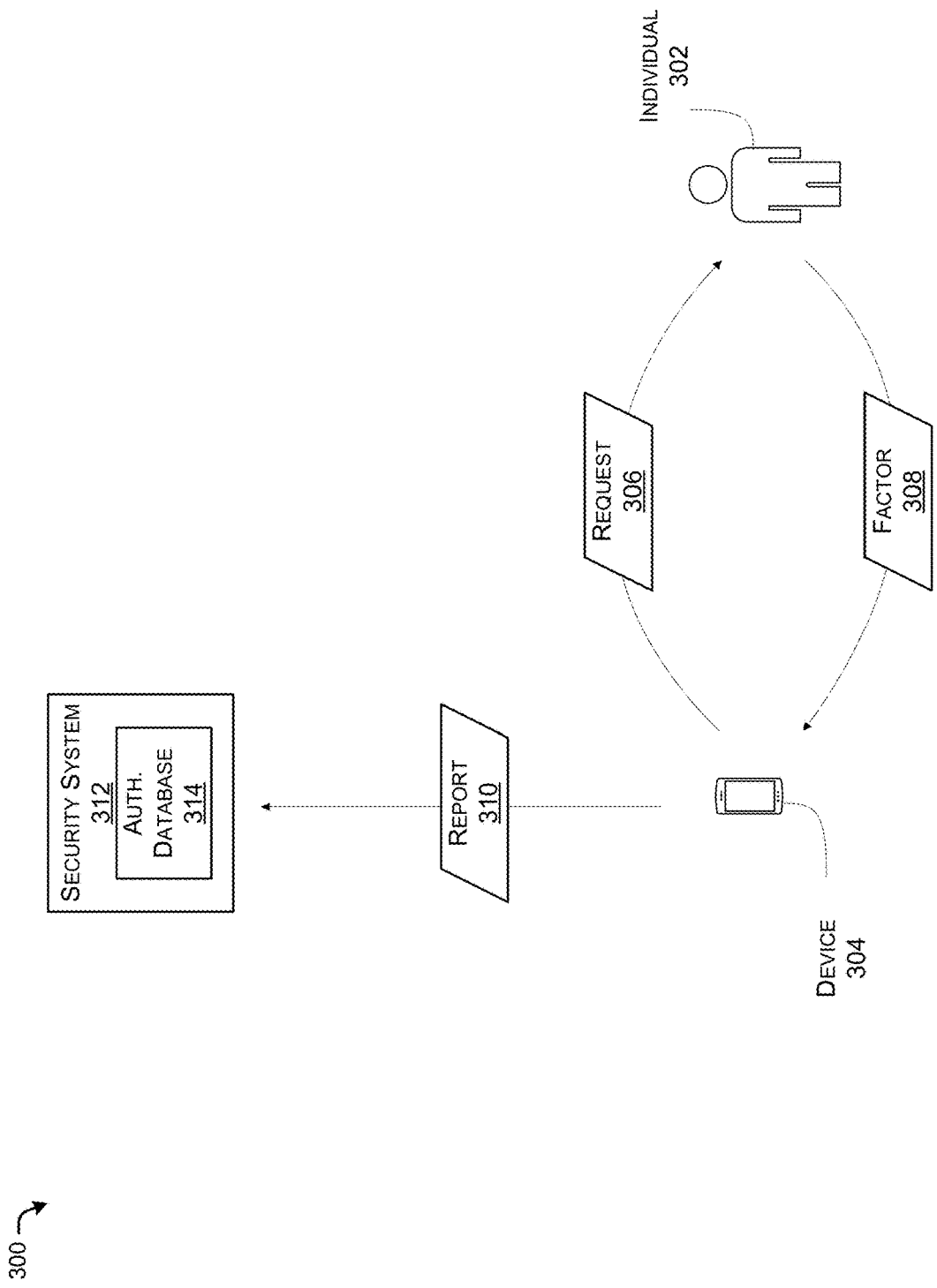
FIG. 3 illustrates example signaling for authenticating an individual associated with a device.

FIG. 3 illustrates example signaling 300 for authenticating an individual 302 associated with a device 304. In various implementations, the individual 302 is carrying the device 304 inside of a building that includes rooms with restricted access. For example, the individual 302 and/or the device 304 may be located in the vicinity of a threshold to a secured space within the building.

In the example of FIG. 3, the device 304 may output a request 306 to the individual 302. In some cases, the request 306 is displayed visually on a screen of the device 304, output as an audible signal from a speaker of the device 304, or indicated by the device 304 vibrating. The request 306 may instruct the individual 302 to input a factor 308 into the device 304.

In response to discerning the request 306, the individual 302 may enter the factor 308 into the device 304 or otherwise enable the device 304 to detect the factor 308. The factor 308 may include one or more authentication factors, such as a voice of the individual 302, a biometric factor of the individual 308, a code associated with the individual 308, a location or pattern of movement associated with the individual 308, or the like. In particular cases, the request 306 is omitted from the signaling 300 and the individual 302 automatically inputs the factor 308 into the device 304, unprompted.

The device 304 may generate a report 310 based on the factor 308 input by the individual 302. In some implementations, the device 304 compares the factor 308 to a predetermined factor associated with an authorized individual. For example, if the factor 308 is a password then the device 304 may compare the factor 308 received from the individual 302 to a password of an individual registered with the device 304. The predetermined factor may be prestored on the device 304. In some cases, the device 304 transmits an indication of the factor 308 to an external device that compares the factor 308 to the predetermined factor stored at the external device. If the factor 308 matches the predetermined factor, the device 304 may determine that the individual 302 is the authorized individual registered with the device 304. If the factor does not match the predetermined factor, the device 304 may output the request 306 again and/or may determine that the individual 302 is unauthorized. In various implementations, the report 310 indicates whether the individual 302 is authorized. According to some implementations, the report 310 further indicates a time at which the factor 308 was received.

In various implementations, the device 304 generates a score indicating a likelihood that the device 304 is being held, carried, or otherwise utilized by the authorized individual registered with the device 304. The device 304 may generate the score based on the comparison between the factor 308 and the predetermined factor 308. In some cases, the score is further based on a time since the factor 308 was received. For instance, if the score is positively correlated with the likelihood that the individual 302 is the registered individual, then the device 304 may increase the score based on the factor 308 confirming the predetermined factor and/or decrease the score based on the factor 308 being different than the predetermined factor. In this instance, the device 304 may further decrease the score as the time since the factor 308 was received increases. The report 310 may indicate the score generated by the device 304.

The device 304 may transmit the report 310 to a security system 312. The security system 312, for instance, is the security system 114 described above with reference to FIG. 1. The security system 114 may perform one or more actions based on the report 310. In various implementations, the security system 312 may selectively provide the individual 302 with access to a secured physical space based on the report 310. For example, the security system 312 may determine that the individual 302 and/or the device 304 is within the vicinity (e.g., within a threshold distance) of a threshold to a secured space. The security system 312 may confirm the identity of the individual 302 based on the report 310. For example, the report 310 may indicate that the individual 302 has been authenticated and/or the security system 312 may authenticate the individual 302 based on the report 310.

Once the individual 302 is authenticated, the security system 312 may determine whether the individual 302 is authorized to enter the secured space using an authorization database 314. In various implementations, the authorization database 314 includes multiple entries indicating which individuals are authorized to enter a particular space in a building. In some cases, the authorization database 314 includes entries indicating which individuals are unauthorized to enter the particular space. Thus, the security system 312 may determine whether the individual 302 is authorized by looking up an identifier of the individual 302 and/or the device 302 in the authorization database 314. If the security system 312 determines that the individual 302 is authorized, then the security system 312 may cause the threshold to unlock and/or open to permit the individual 302 to enter the secured space.

Figure 4:
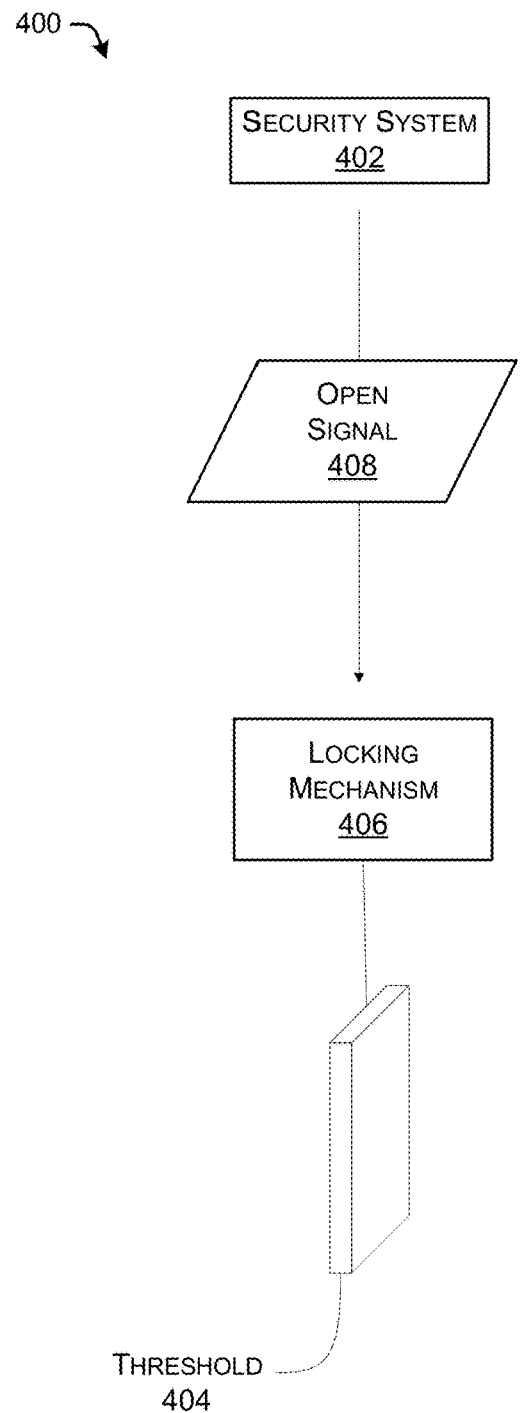
FIG. 4 illustrates example signaling for enabling access to a secured physical space.

FIG. 4 illustrates example signaling 400 for enabling access to a secured physical space. In various implementations, a security system 402 may determine that an individual should be provided access to the secured physical space. The security system 402, for example, may be the security system 114 described above with reference to FIG. 1. In some instances, the security system 402 determines that an individual or an associated device is within the vicinity of a threshold 404, that the individual has been authenticated, and that the individual is permitted access to the secured physical space. Based on these determinations, the security system 402 may provide the individual with access to the secured space via the threshold 404.

According to some cases, the security system 402 is communicatively coupled to a locking mechanism 406. The security system 402 may generate an open signal 408 and transmit the open signal 408 to the locking mechanism 406. In response to receiving the open signal 408, the locking mechanism 406 may unlock the threshold 404. In some cases, the locking mechanism 406 may open the threshold 404 based on the open signal 408. In various implementations, the individual may pass through the threshold 404 into the secured space based on the open signal 408 generated by the security system 402.

Figure 5:
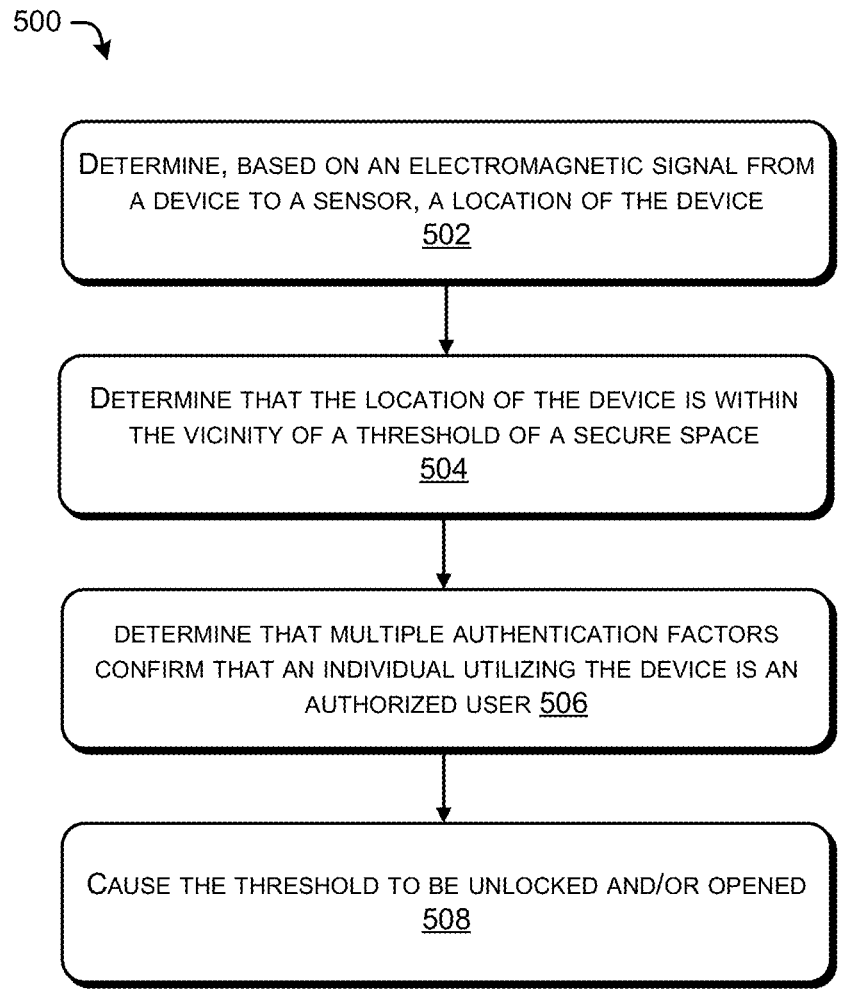
FIG. 5 illustrates an example process for providing selective access to a secured space.

FIG. 5 illustrates an example process 500 for providing selective access to a secured space. The process 500 may be performed by an entity, such as the security system 114 described above with reference to FIG. 1 and/or at least one computing device.

At 502, the entity determines, based on an electromagnetic signal from a device to a sensor, a location of the device. In various cases, the electromagnetic signal has a frequency of greater than 24 GHz, 100 GHz, or 300 GHz. For instance, the electromagnetic signal is a Li-Fi signal. The sensor may be an AP. In some cases, the electromagnetic signal is detected by multiple APs. The location, for instance, may be within a building with walls.

A 504, the entity determines that the location of the device is within the vicinity of a threshold of a secured space. For example, the entity determines that the device is located in a room adjacent to the threshold. In some cases, the entity determines that the device is located within a distance (e.g., 1 m) of the threshold.

At 506, the entity determines that multiple authentication factors confirm that an individual utilizing the device is an authorized user. For example, the authentication factors include two or more of a password, a biometric factor, a location of the device, a pattern of the location of the device over time, a connection between the device and a peripheral device (e.g., an NFC or BLUETOOTH connection between the device an external computing device), a connection between the device and a wireless network (e.g., a connection between the device and another AP or RAN), or a physical orientation of the device over time. The entity may confirm that the multiple authentication factors confirm predetermined authentication factors associated with the authorized user. The multiple authentication factors, in some cases, are detected by the device or some other device and indicated to the entity. In some implementations, the entity calculates or receives an authentication score based on a comparison between the multiple authentication factors and the predetermined authentication factors. The entity may determine that the authentication score is above a first threshold or below a second threshold. In some implementations, the multiple authentication factors and/or authentication score are determined periodically and/or repeatedly.

At 508, the entity causes the threshold to be unlocked and/or opened. For example, the entity may control a locking mechanism to unlock and/or open the threshold. In various implementations, the threshold is a door to the secured space.

Figure 6:
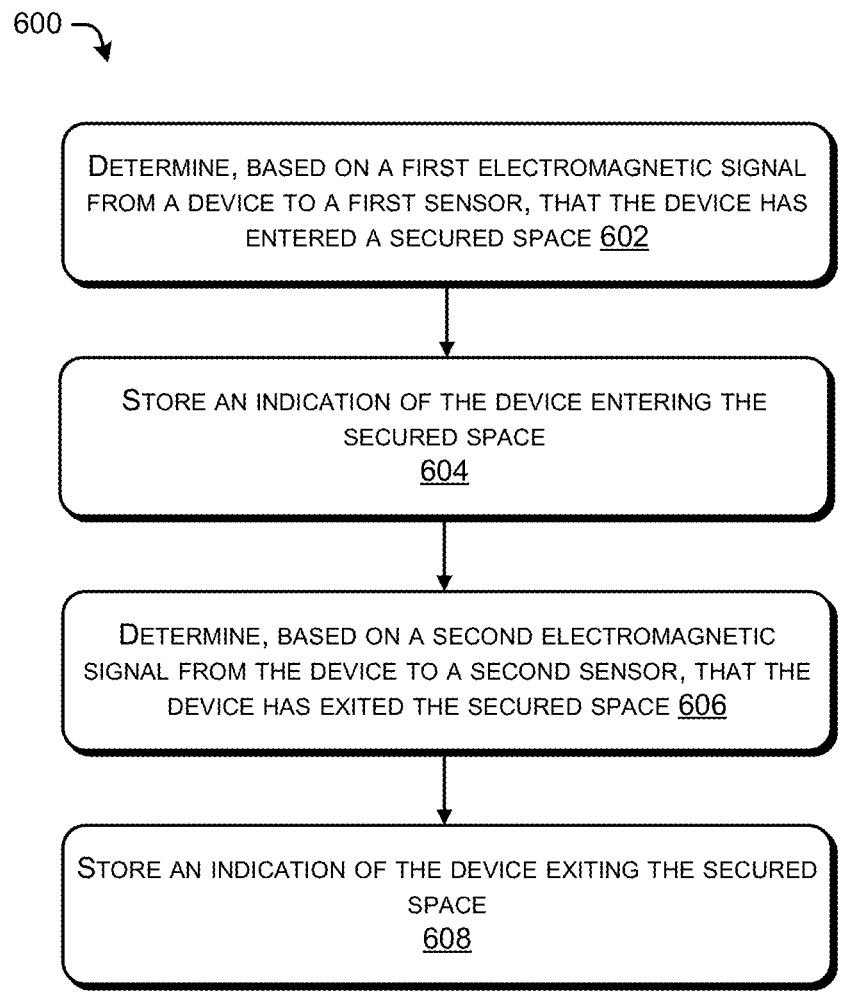
FIG. 6 illustrates an example process for logging the presence of individuals in a secured space.

FIG. 6 illustrates an example process 600 for logging the presence of individuals in a secured space. The process 600 may be performed by an entity, such as the security system 114 described above with reference to FIG. 1 and/or at least one computing device.

At 602, the entity determines based on a first electromagnetic signal from a device to a first sensor, that the device has entered a secured space. In various cases, the first electromagnetic signal has a frequency of greater than 24 GHz, 100 GHz, or 300 GHz. For instance, the first electromagnetic signal is a Li-Fi signal. The first sensor may be an AP located in the secured space. In some cases, the electromagnetic signal is detected by multiple APs located in the secured space.

At 604, the entity stores an indication of the device entering the secured space. For example, the entity logs at least one of an identity of the device, an identity of an individual associated with the device, or a time at which the device was detected in the secured space. In various implementations, the entity stores the indication in a database.

At 606, the entity determines, based on a second electromagnetic signal from the device to a second sensor, that the device has exited the secured space. In various cases, the second electromagnetic signal has a frequency of greater than 24 GHz, 100 GHz, or 300 GHz. For instance, the second electromagnetic signal is a Li-Fi signal. The second sensor may be an AP located outside of the secured space. For instance, the second sensor may be separated from the secured space by at least one wall. In some cases, the electromagnetic signal is detected by multiple APs located outside of the secured space.

At 608, the entity stores an indication of the device exiting the secured space. For example, the entity logs at least one of an identity of the device, an identity of an individual associated with the device, or a time at which the device was detected outside of the secured space. In various implementations, the entity stores the indication in the database. For example, the indication may be stored in the same entry of the database associated with the device entering the secured space.

Figure 7:
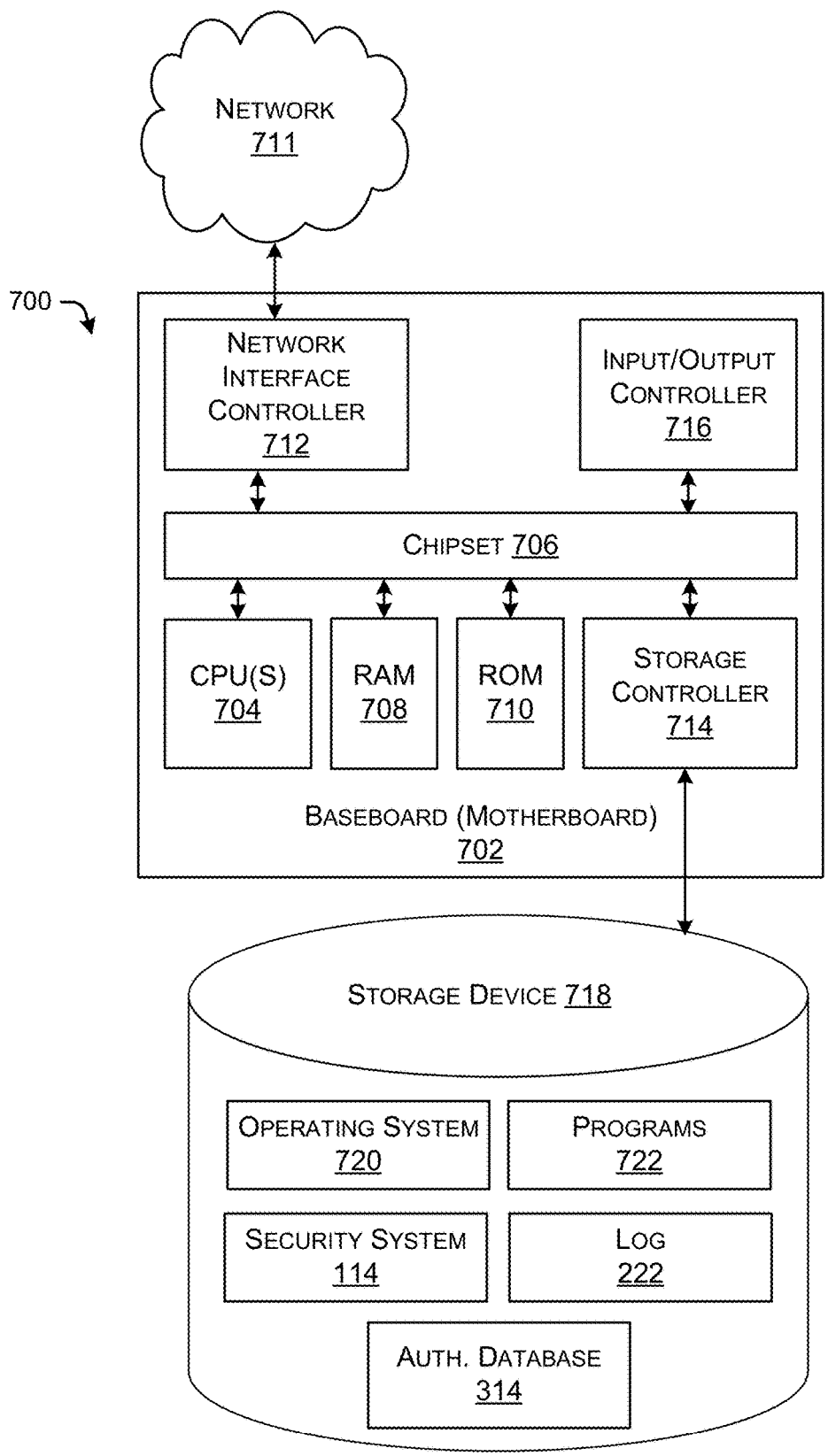
FIG. 7 shows an example computer architecture for a server computer capable of executing program components for implementing the functionality described above.

FIG. 7 shows an example computer architecture for a server computer 700 capable of executing program components for implementing the functionality described above. The computer architecture shown in FIG. 7 illustrates a conventional server computer, workstation, desktop computer, laptop, tablet, network appliance, e-reader, smartphone, or other computing device, and can be utilized to execute any of the software components presented herein.

The computer 700 includes a baseboard 702, or "motherboard," which is a printed circuit board to which a multitude of components or devices can be connected by way of a system bus or other electrical communication paths. In one illustrative configuration, one or more central processing units ("CPUs") 704 operate in conjunction with a chipset 706. The CPUs 704 can be standard programmable processors that perform arithmetic and logical operations necessary for the operation of the computer 700.

The CPUs 704 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 706 provides an interface between the CPUs 704 and the remainder of the components and devices on the baseboard 702. The chipset 706 can provide an interface to a random-access memory (RAM) 708, used as the main memory in the computer 700. The chipset 706 can further provide an interface to a computer-readable storage medium such as a read-only memory (ROM) 710 or non-volatile RAM (NVRAM) for storing basic routines that help to startup the computer 700 and to transfer information between the various components and devices. The ROM 710 or NVRAM can also store other software components necessary for the operation of the computer 700 in accordance with the configurations described herein.

The computer 700 can operate in a networked environment using logical connections to remote computing devices and computer systems through a network, such as the network 711. The chipset 706 can include functionality for providing network connectivity through a network interface controller (NIC) 712, such as a gigabit Ethernet adapter. The NIC 712 is capable of connecting the computer 700 to other computing devices over the network 711. It should be appreciated that multiple NICs 712 can be present in the computer 700, connecting the computer 700 to other types of networks and remote computer systems. In some instances, the NICs 712 may include at least on ingress port and/or at least one egress port.

The computer 700 can be connected to a storage device 718 that provides non-volatile storage for the computer. The storage device 718 can store an operating system 720, programs 722, data, the security system 114, log 222, and authorization database 314, which have been described in greater detail herein. The storage device 718 can be connected to the computer 700 through a storage controller 714 connected to the chipset 706. The storage device 718 can consist of one or more physical storage units. The storage controller 718 can interface with the physical storage units through a serial attached small computer system interface (SCSI) (SAS) interface, a serial advanced technology attachment (SATA) interface, a fiber channel (FC) interface, or other type of interface for physically connecting and transferring data between computers and physical storage units.

The computer 700 can store data on the storage device 718 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 718 is characterized as primary or secondary storage, and the like.

For example, the computer 700 can store information to the storage device 718 by issuing instructions through the storage controller 714 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 700 can further read information from the storage device 718 by detecting the physical states or characteristics of one or more particular locations within the physical storage units.

In addition to the mass storage device 718 described above, the computer 700 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 700. In some examples, the operations performed by any network node described herein may be supported by one or more devices similar to computer 700. Stated otherwise, some or all of the operations performed by a network node may be performed by one or more computer devices 700 operating in a cloud-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 716 can store an operating system 718 utilized to control the operation of the computer 700. According to one embodiment, the operating system comprises the LINUX™ operating system. According to another embodiment, the operating system includes the WINDOWS' SERVER operating system from MICROSOFT Corporation of Redmond, Washington According to further embodiments, the operating system can comprise the UNIX™ operating system or one of its variants. It should be appreciated that other operating systems can also be utilized. The storage device 716 can store other system or application programs and data utilized by the computer 700.

In one embodiment, the storage device 716 or other computer-readable storage media is encoded with computer-executable instructions which, when loaded into the computer 700, transform the computer from a general-purpose computing system into a special-purpose computer capable of implementing the embodiments described herein. These computer-executable instructions transform the computer 700 by specifying how the CPUs 704 transition between states, as described above. According to one embodiment, the computer 700 has access to computer-readable storage media storing computer-executable instructions which, when executed by the computer 700, perform the various processes described above with regard to FIGS. 1-6. The computer 700 can also include computer-readable storage media having instructions stored thereupon for performing any of the other computer-implemented operations described herein.

As illustrated in FIG. 7, the storage device 718 stores programs 722, which may include one or more processes, as well as the security system 114, log 222, and authentication database 314. The programs 722, security system 114, log 222, and authentication database 314 may include instructions that, when executed by the CPU(s) 704, cause the computer 700 and/or the CPU(s) 704 to perform one or more operations.

The computer 700 can also include one or more input/output controllers 716 for receiving and processing input from a number of input devices, such as a keyboard, a mouse, a touchpad, a touch screen, an electronic stylus, or other type of input device. Similarly, an input/output controller 716 can provide output to a display, such as a computer monitor, a flat-panel display, a digital projector, a printer, or other type of output device. It will be appreciated that the computer 700 might not include all of the components shown in FIG. 7, can include other components that are not explicitly shown in FIG. 7, or might utilize an architecture completely different than that shown in FIG. 7.

In some instances, one or more components may be referred to herein as "configured to," "configurable to," "operable/operative to," "adapted/adaptable," "able to," "conformable/conformed to," etc. Those skilled in the art will recognize that such terms (e.g., "configured to") can generally encompass active-state components and/or inactive-state components and/or standby-state components, unless context requires otherwise.

As used herein, the term "based on" can be used synonymously with "based, at least in part, on" and "based at least partly on." As used herein, the terms "comprises/comprising/comprised" and "includes/including/included," and their equivalents, can be used interchangeably. An apparatus, system, or method that "comprises A, B, and C" includes A, B, and C, but also can include other components (e.g., D) as well. That is, the apparatus, system, or method is not limited to components A, B, and C.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

The invention claimed is:

1. A method, comprising:
    identifying a location of a device associated with an authorized user based on a first electromagnetic signal received by at least one first sensor from the device, the first electromagnetic signal having a frequency that is greater than or equal to 300 gigahertz (GHz);
    determining that the location of the device is within a distance of a location of a threshold to a secured space;
    based on determining that the location of the device is within the distance of the location of the threshold, determining that an authentication score indicating that an individual carrying the device is the authorized user is greater than a threshold score, the authentication score being associated with multiple authentication factors identified by the device;
    based on determining that the authentication score is greater than the threshold score, unlocking and/or opening the threshold to the secured space;
    determining, based on a second electromagnetic signal received by at least one second sensor from the device, that the location of the device has moved into the secured space at a first time;
    determining, based on a third electromagnetic signal received by at least one third sensor from the device, that the location of the device has moved out of the secured space at a second time; and
    based on determining that the location of the device has moved out of the secured space, storing an indication of the second time and an indication of at least one of the device or the authorized user.

2. The method of claim 1, wherein at least one of the first electromagnetic signal, the second electromagnetic signal, or the third electromagnetic signal comprises a light fidelity (Li-Fi) signal.

3. The method of claim 1, wherein the location of the device is within a building that comprises walls.

4. The method of claim 1, further comprising:
    repeatedly recalculating the authentication score by:

repeatedly receiving, from the device, indications of the multiple authentication factors associated with the individual carrying the device; and repeatedly comparing the multiple authentication factors to predetermined authentication factors associated with the authorized user.

5. The method of claim 1, wherein the multiple authentication factors comprise two or more of:
   a password entered into the device;
   a biometric factor detected by the device;
   the location of the device over time;
   a connection between the device and a peripheral device;
   a connection between the device and a wireless network; or
   a physical orientation of the device over time.

6. The method of claim 1, further comprising:
   based on determining that the location of the device has moved into the secured space, storing an indication of the first time and the indication of at least one of the device or the authorized user.

7. The method of claim 1, the device being a first device, the authorized user being a first authorized user, the authentication score being a first authentication score, the method further comprising:
   identifying a location of a second device associated with a second authorized user based on a fourth electromagnetic signal received by at least one fourth sensor from the second device at a third time;
   determining that the location of the second device is within the secured space;
   determining that a second authentication score indicating that a second individual carrying the second device is the second authorized user is less than the threshold score; and
   based on determining that the location of the second device is within the secured space and determining that the second authentication score is lower than the threshold score:
      storing an indication of the third time and an indication of the second device; and
      transmitting an alert indicating a possible breach of the secured space to an external device.

8. The method of claim 1, wherein the threshold comprises a window or a door.

9. A system, comprising:
   at least one processor; and
   memory storing instructions that, when executed by the system, cause the system to perform operations comprising:
      identifying a location of a device associated with an authorized user based on a first electromagnetic signal received by at least one first sensor from the device, the first electromagnetic signal having a frequency that is greater than or equal to 300 gigahertz (GHz);
      determining that the location of the device is within a distance of a location of a threshold to a secured space;
      based on determining that the location of the device is within the distance of the location of the threshold, determining that an authentication score indicating that an individual carrying the device is the authorized user is greater than a threshold score, the authentication score being associated with multiple authentication factors identified by the device;
      based on determining that the authentication score is greater than the threshold score, unlocking and/or opening the threshold to the secured space;
      determining, based on a second electromagnetic signal received by at least one second sensor from the device, that the location of the device has moved into the secured space at a first time;
      determining, based on a third electromagnetic signal received by at least one third sensor from the device, that the location of the device has moved out of the secured space at a second time; and
      based on determining that the location of the device has moved out of the secured space, causing storage of an indication of the second time and an indication of at least one of the device or the authorized user.

10. The system of claim 9, wherein at least one of the first electromagnetic signal, the second electromagnetic signal, or the third electromagnetic signal comprises a light fidelity (Li-Fi) signal.

11. The system of claim 9, wherein the location of the device is within a building that comprises walls.

12. The system of claim 9, wherein the operations further comprise: repeatedly recalculating the authentication score by:
   repeatedly receiving, from the device, indications of the multiple authentication factors associated with the individual carrying the device; and
   repeatedly comparing the multiple authentication factors to predetermined authentication factors associated with the authorized user.

13. The system of claim 9, wherein the multiple authentication factors comprise two or more of:
   a password entered into the device;
   a biometric factor detected by the device;
   the location of the device over time;
   a connection between the device and a peripheral device;
   a connection between the device and a wireless network; or
   a physical orientation of the device over time.

14. The system of claim 9, wherein the operations further comprise:
   based on determining that the location of the device has moved into the secured space, storing an indication of the first time and the indication of at least one of the device or the authorized user.

15. The system of claim 9, the device being a first device, the authorized user being a first authorized user, the authentication score being a first authentication score, wherein the operations further comprise:
   identifying a location of a second device associated with a second authorized user based on a fourth electromagnetic signal received by at least one fourth sensor from the second device at a third time;
   determining that the location of the second device is within the secured space;
   determining that a second authentication score indicating that a second individual carrying the second device is the second authorized user is less than the threshold score; and
   based on determining that the location of the second device is within the secured space and determining that the second authentication score is lower than the threshold score:
      storing an indication of the third time and an indication of the second device; and
      transmitting an alert indicating a possible breach of the secured space to an external device.

16. The system of claim 9, wherein the threshold comprises a window or a door.

17. A system for securing a physical space in a building, the system comprising:
- light fidelity (Li-Fi) access points (APs) mounted in the building and configured to receive Li-Fi signals from devices in the building;
- at least one processor that is communicatively coupled to the Li-Fi APs; and
- memory communicatively coupled to the at least one processor and storing instructions that, when executed by the at least one processor, cause the at least one processor to perform operations comprising:
  - identifying, based on the Li-Fi signals, first locations of the devices within the building;
  - determining that the first locations of the devices are within a distance of a threshold to a secured space;
  - based on determining that the first locations of the devices are within the distance of the threshold, determining that authentication scores indicating that individuals carrying the devices are authorized users are greater than a threshold score, the authentication scores being associated with multiple authentication factors identified by the devices;
  - based on determining that the authentication scores are greater than the threshold score, unlocking and/or opening the threshold to the secured space;
  - identifying, based on the Li-Fi signals, second locations of the devices within the building;
  - determining that the second locations of the devices are within the secured space at first times;
  - based on determining that the second locations of the devices are within the secured space, logging entries of the authorized users into the secured space by storing indications of the first times and indications of at least one of the devices or the authorized users;
  - identifying, based on the Li-Fi signals, third locations of the devices within the building;
  - determining that third locations of the devices are outside of the secured space at second times, the second times occurring after the first times; and
  - based on determining that the third locations are outside of the secured space, storing an indication of the second times.

18. The system of claim 17, the devices being first devices, the individuals being first individuals, the authentication scores being first authentication scores, wherein the operations further comprise:
- identifying, based on the Li-Fi signals, a fourth location of a second device within the building;
- determining that the fourth location of the second device is within a threshold distance of the threshold to the secured space;
- based on determining that the fourth location is within the threshold distance, identifying a second authentication score of a second individual utilizing the second device;
- determining that the second authentication score is below the threshold score; and
- based on determining that the second authentication score is below the threshold score, refraining from unlocking and/or opening the threshold to the secured space.

19. The system of claim 17, wherein the Li-Fi signals have one or more frequencies that are greater than or equal to 300 GHz and less than or equal to 30 petahertz (PHz).

20. The system of claim 17, wherein the threshold comprises a window or a door.

\* \* \* \* \*